United States Patent [19]

Inagaki

[11] Patent Number: 4,993,238
[45] Date of Patent: Feb. 19, 1991

[54] MANUFACTURING METHOD FOR ICE-CREAM PRODUCTS AND ITS APPARATUS FOR THE SAME

[76] Inventor: Jitsuo Inagaki, 71, Aza Kamiyashiki, Oaza Itsusiki, Itsusikicho Hazugun, Aichi, Japan

[21] Appl. No.: 432,454

[22] Filed: Nov. 6, 1989

Related U.S. Application Data

[62] Division of Ser. No. 317,755, Mar. 2, 1989, abandoned.

[51] Int. Cl.$^5$ .................................................. A23G 9/10
[52] U.S. Cl. ....................................... 62/306; 62/342; 366/102
[58] Field of Search .................. 426/565, 524; 99/473; 62/342, 306, 70; 366/102–105, 169

[56] References Cited

U.S. PATENT DOCUMENTS

| | | | |
|---|---|---|---|
| 2,541,814 | 2/1951 | Gaddini | 62/342 X |
| 2,909,433 | 10/1959 | Morrison | 62/70 X |
| 4,002,323 | 1/1977 | Grun | 366/102 |
| 4,283,357 | 8/1981 | Sidrey | 366/102 X |
| 4,480,924 | 11/1984 | Preda | 366/102 |

Primary Examiner—William E. Tapolcai
Attorney, Agent, or Firm—Donald W. Hanson

[57] ABSTRACT

An object of this invention is to provide a manufacturing method and apparatus for ice-cream products which enable a consumer to select and nominate the material and to be supplied and ice-cream in accordance with his preference from those selected material. According to the present invention, the method comprises preparing a mixture of the material bulk of ice-cream selected by an individual in accordance with his preference, filling into a container thereof by means of applying thereto a liquid nitrogen or a liquid nitrogen based gas while said bulk is agitated.

7 Claims, 4 Drawing Sheets

MANUFACTURING METHOD FOR ICE-CREAM PRODUCTS AND ITS APPARATUS FOR THE SAME

This application is a divisional application of application Ser. No. 317,755, filed Mar. 2, 1989, now abandoned.

BACKGROUND OF THE INVENTION

The present invention relates to a manufacturing method for ice-cream products and an apparatus for the same which enables a consumer to select and nominate the material of the ice-cream products depending on the favorite taste of an individual at a shop.

Ice-cream is known and is a favorable preference of thousands of people as a chilled products prepared by mixing ingredients such as milk, dairy products, sugar, emulsifying agents, stabilizers, colorants flavoring agents chocolate, coffee, nuts, fruit juice, and fruits, chilling during agitation and then freezing in a form.

Since most of the ice-cream sold at a cafe or an ice-cream shop is supplied from a big batch from bulk production, there are many restriction of kinds thereof, and thus, the prefence and favorite flavor of an individual consumer is not accommodated even though ice-cream itself is a delightful selective product with many kinds of flavor variations.

SUMMARY OF INVENTION

It is an object of this invention to provide a manufacturing method for ice-cream products and an apparatus for the same, of which ice-cream can be occasionally and readily supplied to an individual consumer depending on the favorite flavor of such individual at a cafe or an ice-cream shop.

It is another object of this invention to provide a manufacturing method and apparatus for ice-cream products which can produce these products in a very short time.

It is another object of this invention to provide a manufacturing method and apparatus for ice-cream products which help prevent oxidization of such produced ice-cream and deterioration of taste or flavor thereof.

The foregoing objects and other objects as well as the characteristics features of this invention will become readily apparent from the following description when taken in conjunction with accompanying drawings.

DESCRIPTION OF THE PREFERRED EMBODIMENTS

In order to achieve the foregoing objects of this invention, the inventor paid his attention, after enthusiastic studies, to the fact that the conventional manufacturing method for ice-cream requires a long cooling time such that the products could not be produced and supplied occasionally and readily in a short period of time, he reached this invention through finding that ice-cream can be produced in a extremely short time by cooling by means of the of liquid nitrogen directly into the material bulk of ice-cream to be manufactured or by the introduction of liquid nitrogen gas thereto. According to one feature of this invention, the material bulk ice-cream to be produced is prepared by mixing after selection by an individual in accordance with his preference, which then is filled into a container wherein a liquid nitrogen or a liquid nitrogen based gas is introduced and the bulk chilled while it is agitated.

According to another feature of this invention, a container for producing ice-cream is rotatable by a driving force in its lower portion, and a cooling whirl in a form of hollow shape is disposed in its interior and provided with a plurality of discharge orifices for applying a liquid nitrogen or a liquid nitrogen based gas.

According to another feature of this invention, a manufacturing method and apparatus for ice-cream products comprises a container for producing ice-cream, an agitation wheel disposed in said container and a plurality of discharge orifices for applying a liquid nitrogen or a liquid nitrogen based gas.

It should be understood from this invention that liquid nitrogen itself may be applied to the material bulk to produce ice-cream or a liquid nitrogen based gas such as those which are air mixed and of a temperature appropriately controlled may also be employed. However, the employment of liquid nitrogen itself if preferable to the extent that it will prevent oxidization of the ice-cream and deterioration of the taste or flavor thereof without using any anti-oxidized agents.

As used herein, the terms "ice-cream" or "ice-cream products" shal be all inclusive and include for example conventional ice-cream, sherbet and soft ice-cream.

The preferred embodiment of this invention will be described in detail with reference to the accompanying drawings.

Figure 1:
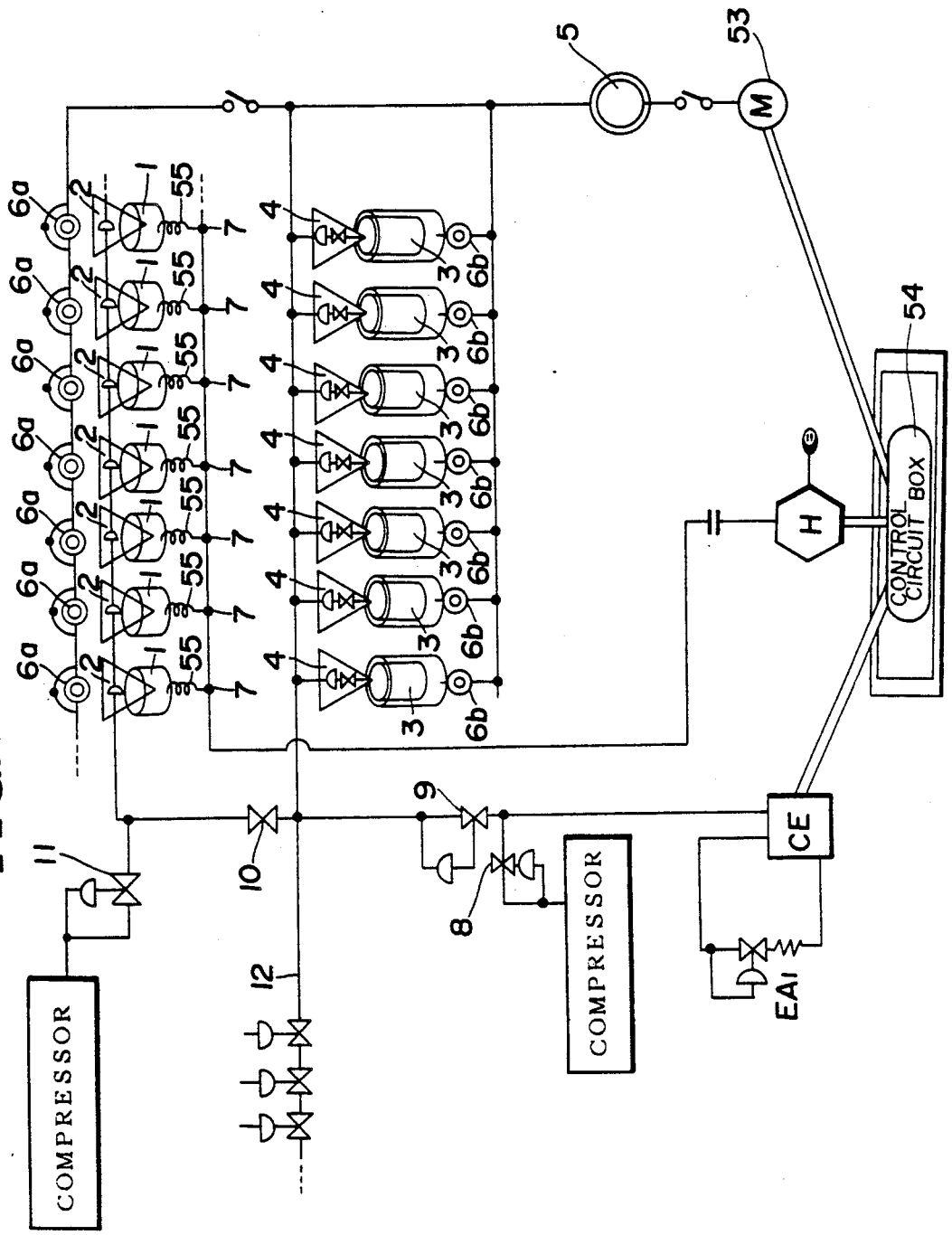
FIG. 1 is a distribution diagram showing an embodiment of this invention.

FIG. 1 shows a distribution diagram for manufacturing ice-cream according to this invention in which, the material bulk selected by a consumer is filled into a container 1, where the material bulk is mixedly agitated homogeneously by agitation wheel 2, and then a the container is properly heated for pasteurization of the material. Consequently, a mixing gas of liquid nitrogen and air controlled to a temperature in the range of about $-1°\sim-10°$ C. is sprayed into the container 1 through a plurality of discharge orifices communicating with a hollow portion inside the agitation wheel, and thus the material bulk is prepared by chilling at reasonable temperature. Such prepared material bulk for ice-cream is filled into a cooling container 3, and a mixing gas of a liquid nitrogen and air controlled to a temperature of $-100°\sim-200°$ C. is introduced into the cooling container which is rotated, and then the material bulk is chilled and frozen while the bulk is mixedly agitated, and thus high quality ice-cream is obtained. The so produced ice-cream is supplied to the consumer with some sauce poured on if so desired. The driving force of motor 53 is controlled through control circuit box 54 which is connected to a transmission 5 to have first control of the entire rotation for the agitation wheels 2 and the cooling containers 3. Transmissions 6a, are provided at each of agitation wheels 2 and transmissions 6b are provided at each of cooling containers 3 to serve as a second control of the cancel respective rotation of agitation wheels and cooling containers. By these provisions one advantage will be realized that respective rotating motion or speed for each agitation wheel 2 or cooling container 3 is independently variable and can be properly set depending upon the requested kind or flavor of the ice-cream. In the process of the material bulk preparation, the heating of the container is made accomplished by each heater respectively set at required temperature by means of control system 7 consisting of a sensor and a switch controlled via control circuit box 54.

A liquid nitrogen gas is introduced into the pressurized evaporator $EA_1$, where the gas is gasified and adjusted to a reasonable degree and temperature by the self-pressure valve to have a mixing with air which then compressed by a compressor where controlled at reasonable pressure equivalent to a liquid nitrogen gas by reducing valve 8. The mixing gas is adjusted to a reasonable degree of pressure to spray into a cooling container 3 through discharge orifices of cooling 4.

The mixing gas is again adjusted to a reasonable degree of pressure by secondary adjustable valve 10 to have a mixing with air which is compressed by a compressor where controlled at reasonable pressure equivalent to a liquid nitrogen gas by reducing valve 11. The mixing gas is sprayed out into container 1 through discharge orifices of the agitation wheel.

In the above mentioned embodiment, liquid nitrogen gas is supplied from the cooling source of a freezer for storage of ice-cream, a refrigerator for storage of various material and a refrigerating show-case for fruits and wines, via bypass 12.

Figure 2:
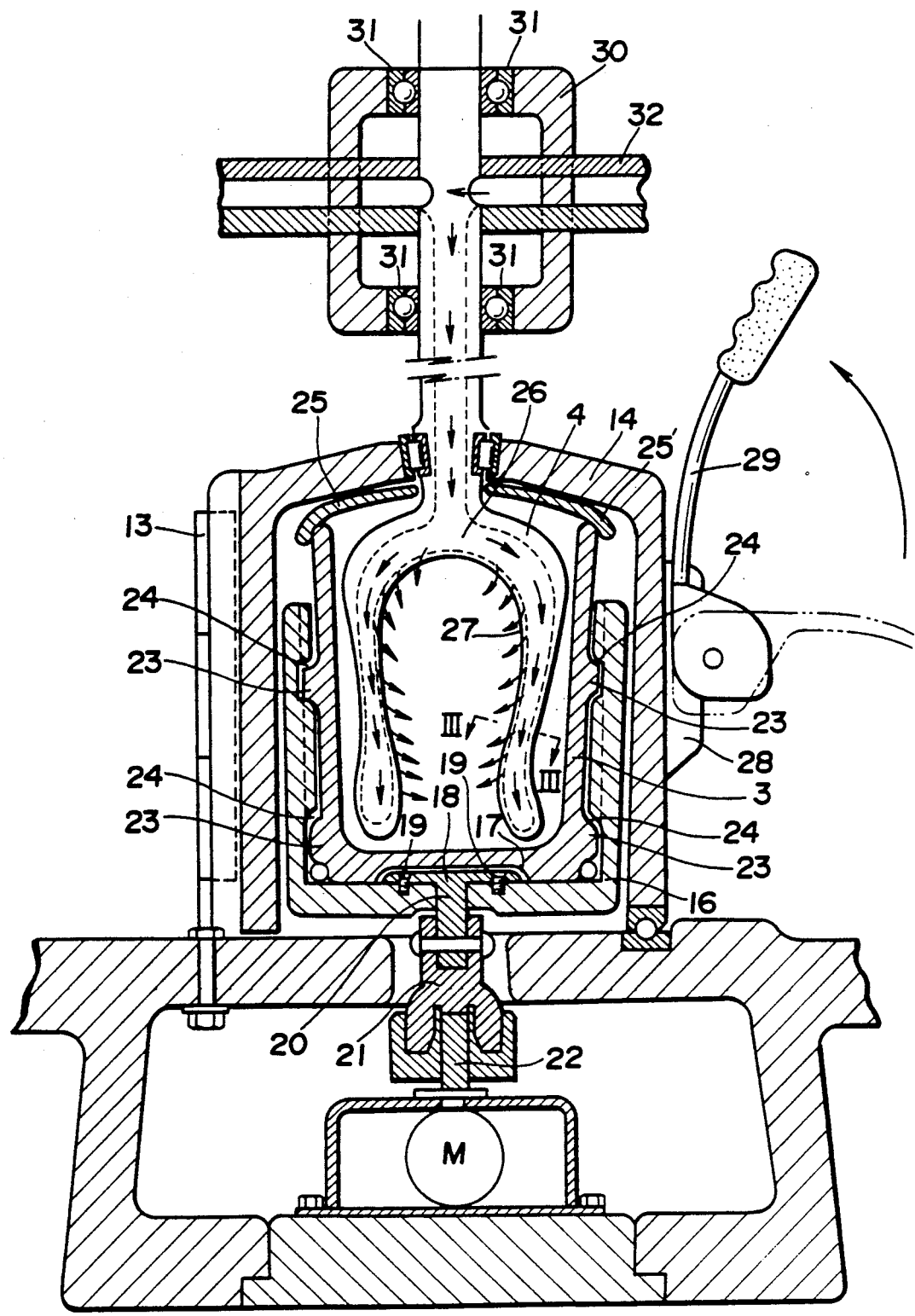
FIG. 2 is a cross sectional view showing an embodiment of an apparatus of this invention.

FIG. 2 shows an embodiment of a manufacturing apparatus for ice-cream of this invention, comprising a housing 14 which is openable along axis of hinge 13 at one end, a heat-isolating container 16 made of ceramic which is interposed between said housing 14 and a cooling container 3 made of ceramic and rotatable by a driving source provided beneath, and a cooling whirl 4 which is disposed within said cooling container 3.

A cross shaped groove 17 is provided in the bottom of a heat-isolating container 16 to fixedly engage with top end 18 of a cross shaped metal connector 20 by the threads 19. The shaft of the connector 20 extends through the heat-isolating container 16 to engage with a groove of a rubber connector 21 on its top end, and the rubber connector is secured with a driving shaft 22 of a motor.

Convexes 23 are formed on the central portion and lower portion of the outer circumference of the cooling container 3 to engage with the circular concaves 24 which are formed on inner circumference of the heat-isolating container 16 in manner having an upward taper on the engaged surface toward the convexes and the rotating direction. Two vertical grooves are formed extending beyond said circular concaves 24 in a crosswise direction in the inner circumference of the heat-isolating container 16 for the purpose to remove the cooling container 3 from the heat-isolating container 16 at an orientation through said grooves.

Figure 4:
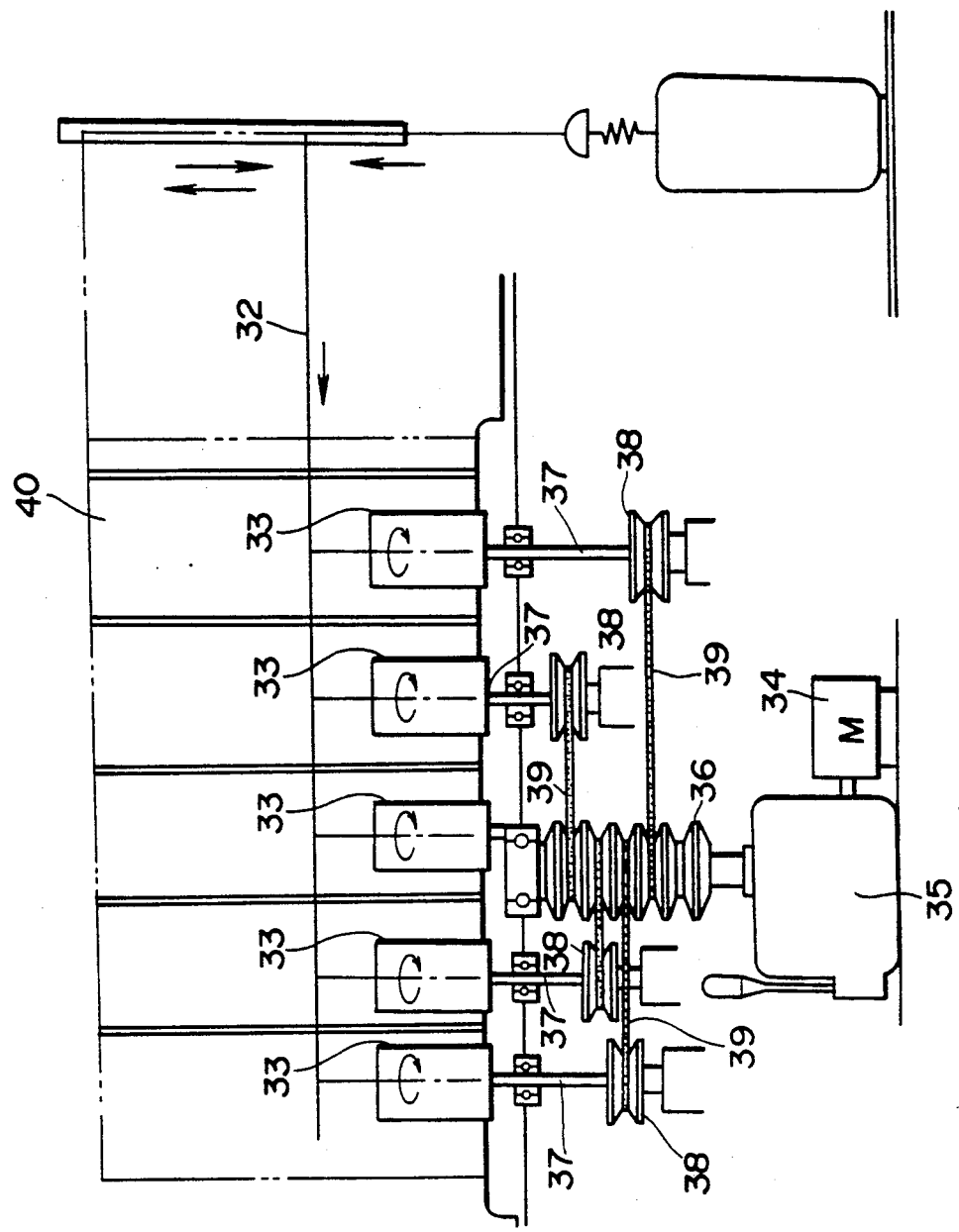
FIG. 4 is a general assembly view showing another embodiment of an apparatus of this invention.
Figure 3:
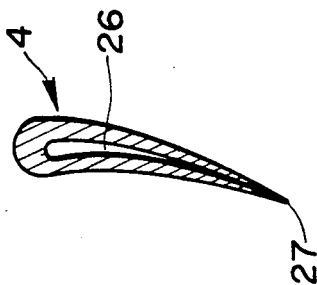
FIG. 3 is a sectional view taken along the line III—III in FIG. 2.

Two semicircular closure 25, 25' are mounted on the top of the cooling container 3 to be removable by separation of the two when the cooling whirl 4 is elevated upwardly. The cooling whirl 4 is disposed in the cooling container 3 so as to be elevationally movable, and the inside of the whirl is formed in a hollow shape and provided a plurality of discharge orifices 27 on the outer circumference thereof to communicate with said hollow portion to spray the gas. As shown in FIG. 3, a cross section of the cooling 4 is formed in a streamline shape toward the inward thereof, and is provided with a gas discharge orifice 27 on top of the sharp edge thereof. Turning back to FIG. 2, the 14 is formed in a split cylindrical body which is operable with an axis of hinge 13 at one end, and a flange 28 is integrally formed on an opposed end of each split body. A lever 29 is secured to flange 28 so as to be able to fixedly shut the split bodies when said lever is left up, and to be able to release such shut down for opening such bodies when said lever is left down. On the upper portion of the shaft of the cooling whirl, square shaped shaft retaining member 30 is provided through bearings 31 to retain the shaft rotatable and elevationally movable, and distribution pipe 32 is connected across the shaft. The mixing gas of a liquid nitrogen and air is introduced, as indicated by the arrow direction in FIG. 2, from said distribution pipe 32 through the passageway of the inside hollow portion of the shaft into the cooling container 3 to be sprayed out from each discharge orifice 27 of the cooling whirl 4. Another embodiment of this invention is shown in FIG. 4 wherein the rotating motion of a plurality of containers for producing ice-cream is provided by a pulley from a motor driving force.

An automatic transmission 35 linked with a motor 34 is interlinked with a pulley 36 which provides a plurality of whorls of which number correspond to the number of containers to be rotated by a belt driving, and which is interlinked with each pulley 38 interlocked through a belt by a rotation shaft of a container on the bottom.

The rotation speed of each container may be controlled by a individual transmission directly or adjusted by changing the size of pulley to be driven by the belt. As shown in this embodiment, the distribution pipe 32 for mixing gas is always engaged with a cooling whirl as a unit with this structure, and thus both can be simultaneously movable in elevation. When it is not necessary to use a coding whirl they can be stored in a cabinet 40 provided in the upper portion as shown in FIG. 4.

Figure 5:
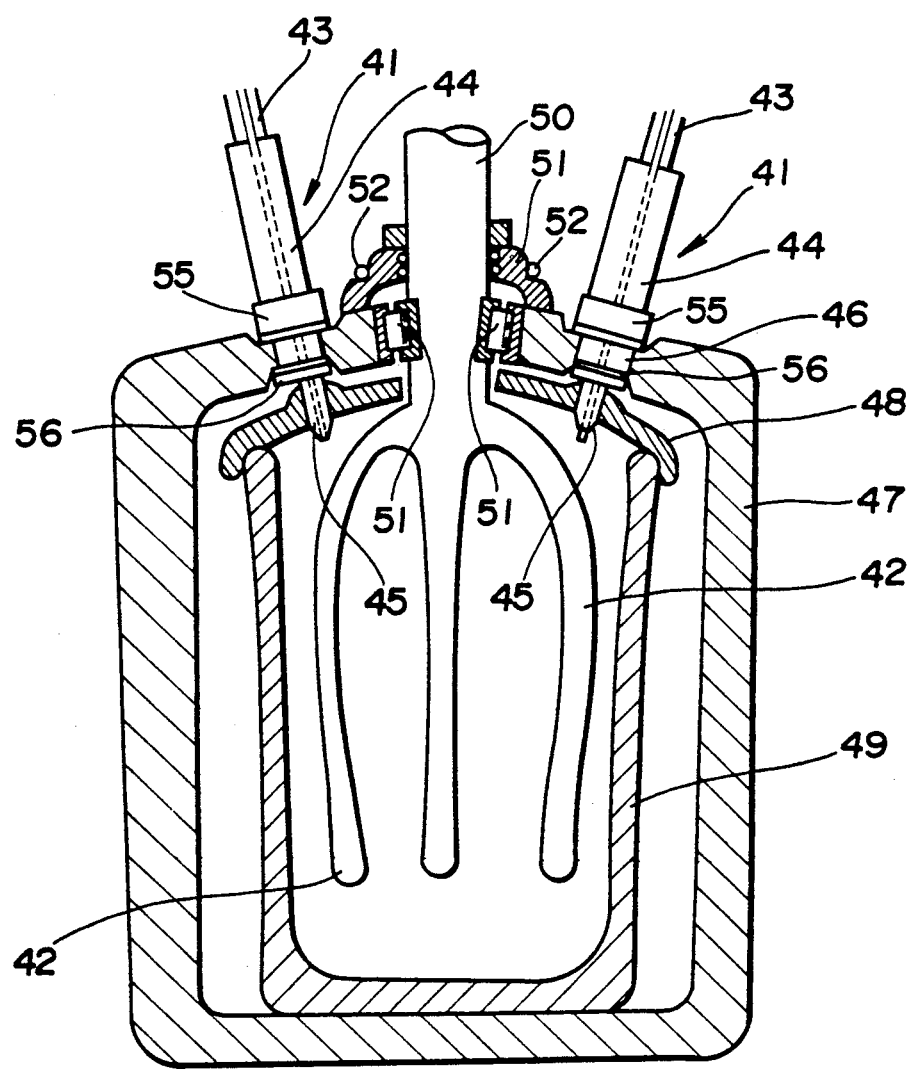
FIG. 5 is a sectional view showing another embodiment of an apparatus of this invention.

FIG. 5 shows another embodiment of this invention, wherein a pair of insertion nozzles 41 for mixing gas discharge are disposed in a crosswise orientation facing each other, and the agitation wheel is driven by a motor. The nozzle 45 is connected with a flexible pipe 43 through connector 44. The flexible pipe 43 is linked with a distribution pipe, and is threaded with the housing 47 by thread at the outside, and the top end thereof is extended to the inside of container 49 through closure 48 of a cooling container. Numerals 55, 56 in FIG. 5 represent fastening nuts by which insertion nozzle 41 is fixedly retained. Shaft 50 of the agitation wheel 42 is retained by the housing 47 through roller bearings 51. On the upper surface of such engaging portion for shaft 50 sealing lip 51 is provided by a spring 52 mounted around so as to airtightly seal the shaft. According to this embodiment, finished ice-cream can be taken out by means of either an elevational motion of the agitation wheel or movement of the container to the contrary.

According to this invention as described above, any consumer can select and nominate his preferred material, and then the ice-cream can be supplied occasionally and readily in accordance with the favorite preference of an individual. Therefore not only is the consumer delighted with an enjoyable variation of the ice-cream, but also the seller can always supply the exact ice-cream that the consumer really desires.

What is claimed is:

1. An apparatus for manufacturing ice-cream products comprising a rotatable container to produce ice-cream products having a driving force beneath thereof, said container having a groove formed in its bottom and a connector coupled to a motor drive shaft for the driving force fitted in said groove, a cooling whirl disposed in said container, the interior of the cooling whirl formed in a hollow shape and provided with a plurality of discharge orifices, and means for introducing a liquid nitrogen or a liquid nitrogen based gas into said container through said orifices in the cooling whirl.

2. An apparatus according to claim 1, wherein said cooling whirl has a shape of an inverse U, the hollow shape of the cooling whirl has a sectional profile in the form of an inwardly directed streamline, and the end of said streamline-like shape is formed with a gas jet port.

3. An apparatus according to claim 1, wherein the container for manufacturing ice cream is accommodated in a housing, and a heat-isolating container made of ceramic is interposed between the container for manufacturing ice cream and the housing.

4. An apparatus according to claim 3, wherein said container for manufacturing ice cream has its outer periphery formed with convexes, said convexes being fitted in circular concaves having a rising taper extending in the direction of rotation of the inner periphery of said heat-isolating container.

5. An apparatus for manufacturing ice-cream products comprising a rotatable container to produce ice-cream products having a driving force beneath thereof, the container accommodated in a housing and a heat-isolating container made of ceramic interposed between the container and the housing, a cooling whirl disposed in said container, the interior of the cooling whirl formed in a hollow shape and provided with a plurality of discharge orifices, and means for introducing a liquid nitrogen or a liquid nitrogen based gas into said container through said orifices in the cooling whirl.

6. An apparatus according to claim 5, wherein said cooling whirl has a shape of an inverse U, the hollow shape of the cooling whirl has a sectional profile in the form of an inwardly directed streamline, and the end of said streamline-like shape is formed with a gas jet port.

7. An apparatus according to claim 5, wherein said container for manufacturing ice cream has its outer periphery formed with convexes, said convexes being fitted in circular concaves having a rising taper extending in the direction of rotation of the inner periphery of said heat-isolating container.

* * * * *